United States Patent
Choi et al.

(10) Patent No.: US 11,946,541 B2
(45) Date of Patent: Apr. 2, 2024

(54) METHOD OF CONTROLLING EOP OF POWERTRAIN OF VEHICLE

(71) Applicants: Hyundai Motor Company, Seoul (KR); Kia Corporation, Seoul (KR)

(72) Inventors: Sung Sik Choi, Hwaseong-Si (KR); Kyung Moo Lee, Yongin-Si (KR); Seong Min Son, Pohang-Si (KR); Ki Bum Kim, Seoul (KR); Se Hwan Jo, Bucheon-Si (KR); Bong Uk Bae, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 483 days.

(21) Appl. No.: 17/408,299

(22) Filed: Aug. 20, 2021

(65) Prior Publication Data

US 2022/0268353 A1 Aug. 25, 2022

(30) Foreign Application Priority Data

Feb. 23, 2021 (KR) .................. 10-2021-0024041

(51) Int. Cl.
*F16H 57/04* (2010.01)
(52) U.S. Cl.
CPC ..... *F16H 57/0436* (2013.01); *F16H 57/0443* (2013.01)
(58) Field of Classification Search
CPC ............. F16H 57/0436; F16H 57/0443; F16H 57/0476; B60Y 2200/91; B60Y 2200/92; Y02T 10/62; B60W 10/30; B60W 40/072; B60W 40/076; B60W 40/10; B60W 2050/0002; B60W 2520/105; B60W 2520/125; B60W 2540/18; B60W 2552/15; B60W 2556/50

See application file for complete search history.

(56) References Cited

U.S. PATENT DOCUMENTS

| | | | | |
|---|---|---|---|---|
| 2001/0035048 | A1* | 11/2001 | Gualtieri | G01F 23/284 73/290 V |
| 2009/0318255 | A1* | 12/2009 | Kato | B60K 1/00 903/910 |
| 2010/0030452 | A1* | 2/2010 | Rodriguez | F02D 33/003 701/104 |
| 2017/0355260 | A1* | 12/2017 | Dudar | B29C 71/00 |
| 2018/0045295 | A1* | 2/2018 | Kiyokami | B60K 6/445 |
| 2018/0073626 | A1* | 3/2018 | Schilling | F16H 57/0458 |
| 2018/0304713 | A1* | 10/2018 | Kaskowicz | F16F 15/023 |
| 2019/0331216 | A1* | 10/2019 | Dong | F16H 61/0031 |

FOREIGN PATENT DOCUMENTS

KR 10-2017-0071151 7/2017

* cited by examiner

*Primary Examiner* — Vivek D Koppikar
*Assistant Examiner* — Dominick Mulder
(74) *Attorney, Agent, or Firm* — MORGAN, LEWIS & BOCKIUS LLP

(57) ABSTRACT

A method of controlling an EOP of a powertrain may include determining, by a controller electrically connected to the EOP, whether an oil sloshing phenomenon in which it is difficult for oil to return to a space where an oil intake port of the EOP is positioned may occur while a vehicle is running; and reducing, by the controller, the revolutions per minute (RPM) of the EOP by a predetermined reduced RPM when it is determined that the oil sloshing phenomenon may occur.

17 Claims, 3 Drawing Sheets

METHOD OF CONTROLLING EOP OF POWERTRAIN OF VEHICLE

CROSS REFERENCE TO RELATED APPLICATION

The present application claims priority to Korean Patent Application No. 10-2021-0024041, filed Feb. 23, 2021, the entire contents of which is incorporated herein for all purposes by this reference.

BACKGROUND OF THE INVENTION

Field of the Invention

The present relates to a technology for controlling an electric oil pump (EOP) that pumps oil required for a powertrain of a vehicle.

Description of Related Art

Recently, there are increasing cases in which a vehicle is provided with a powertrain of a hybrid vehicle using an engine and a motor, or a powertrain of an electric vehicle configured to drive the vehicle using only a motor.

There is a trend in which an electric powertrain as described above is mainly provided with an electric oil pump (EOP) instead of a mechanical oil pump, to supply oil suitable for a driving situation of the vehicle.

The oil in the powertrain may be sloshed to one side in the powertrain in a case of acceleration/deceleration or turning driving of the vehicle, and in the instant case, an oil intake port of the EOP is exposed outside an oil level, whereby there may occur a case in which the EOP is unable to pump the oil.

In other words, oil must be returned from a place where the EOP pumped and supplied the oil, and the oil must be recovered to a space where the oil is to be pumped again, but when the oil is unable to return due to the acceleration of the vehicle, and the like, the oil is continuously pumped by the EOP, whereby it is possible to cause a situation where the oil intake port of the EOP is exposed to the air.

In the situation where the EOP is unable to pump the oil as described above, durability of the EOP itself may deteriorate, and lubrication and cooling of devices positioned in the space where the oil intake port of the EOP is positioned are not properly performed, whereby it is possible to cause a problem in that the durability of the devices deteriorates.

For example, when the powertrain includes a motor and a transmission for changing the power of the motor, it is general to configure a mechanism of lubrication and cooling such that the oil intake port of the EOP is positioned under the space where a plurality of gears forming the transmission is positioned, and the plurality of gears forming the transmission performs churning of the lubricating oil which is collected by way of being returned to a portion where the oil intake port is positioned, to allow the lubrication and cooling to be performed. Accordingly, when the oil is sloshed to one side in a state where the oil intake port is unable to suction the oil, the oil may not be churned, whereby the EOP itself, as well as the plurality of gears forming the transmission will not be properly lubricated and cooled.

Conventionally, to solve the above-described problems, a method of increasing the amount of oil carried in the powertrain is used so that oil churning and pumping may be performed even in the situation where the oil may be sloshed to one side to cause the above problems. However, since the present amount of oil is excessive in terms of the general driving situation of the vehicle, there are side effects including: unnecessary vehicle weight increase and increased dragging of moving parts inside the powertrain due to the excessive amount of oil; increased possibility of oil leakage; and the like.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling an EOP of a powertrain of a vehicle, wherein even without carrying additional oil to prevent the powertrain oil from being sloshed to one side depending on a driving situation of the vehicle, proper oil supply is always available to all parts that need oil, to prevent deteriorating of the durability of the entire powertrain including the EOP, and enable to reduce cost and weight due to the exclusion of the additional oil, avoid unnecessary dragging of moving parts inside the powertrain due to the excessive amount of oil, and reduce the possibility of oil leakage.

According to various exemplary embodiments of the present invention for achieving the objective as described above, there is provided a method of controlling an EOP of a powertrain, the method including: determining, by a controller electrically connected to the EOP, whether an oil sloshing phenomenon in which it is difficult for oil to return to a space where an oil intake port of the EOP is positioned may occur, while a vehicle is running; and reducing, by the controller, the revolutions per minute (RPM) of the EOP by a predetermined reduced RPM when it is determined that the oil sloshing phenomenon may occur.

When a longitudinal acceleration of the vehicle is greater than or equal to a predetermined reference acceleration, the controller may be configured to determine that the oil sloshing phenomenon may occur.

When a gradient sensor mounted on the vehicle detects that a gradient of a road on which the vehicle is running is greater than or equal to a predetermined reference gradient, the controller may be configured to determine that the oil sloshing phenomenon may occur.

When a lateral acceleration determined from a steering wheel angle and a speed of the vehicle is greater than or equal to a predetermined reference lateral acceleration, the controller may be configured to determine that the oil sloshing phenomenon may occur.

When a lateral acceleration of the vehicle determined from road curvature data received from a navigation of the vehicle and a current speed of the vehicle is greater than or equal to a reference lateral acceleration, the controller may be configured to determine that the oil sloshing phenomenon may occur.

When a lateral acceleration of the vehicle detected by a lateral acceleration sensor mounted on the vehicle is greater than or equal to a reference lateral acceleration, the controller may be configured to determine that the oil sloshing phenomenon may occur.

The method of controlling an EOP of a powertrain may further include: increasing, by the controller, the revolutions per minute (RPM) of the EOP by the predetermined reduced RPM when the oil sloshing phenomenon is resolved.

The present invention ensures that even without carrying additional oil to prevent the powertrain oil from being sloshed to one side depending on the driving situation of the vehicle, proper oil supply is always available to all parts that need oil, preventing deterioration of the durability of the entire powertrain including the EOP, and facilitating to reduce cost and weight, avoid unnecessary dragging, and reduce the possibility of oil leakage, due to the exclusion of the additional oil.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
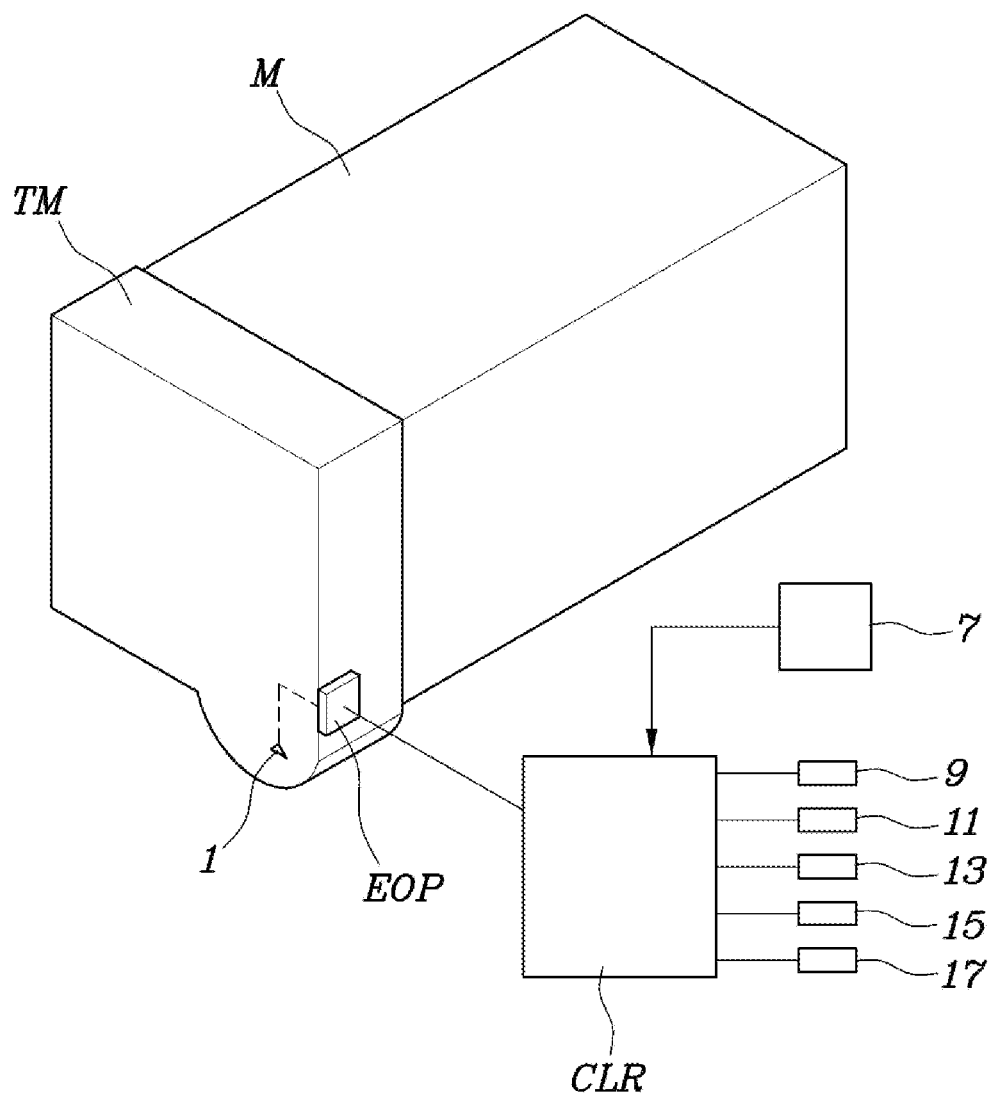
FIG. 1 is a view showing a configuration of a powertrain of a vehicle to which various exemplary embodiments of the present invention may be applied.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Specific structural and functional descriptions of the exemplary embodiments of the present invention disclosed herein are only for illustrative purposes of the exemplary embodiments of the present invention. The present invention may be embodied in various forms. Therefore, the exemplary embodiments of the present invention should not be construed as limiting the present invention.

Since the exemplary embodiments of the present invention may be variously modified in many different forms, specific embodiments will be illustrated in the drawings and described in detail in the specification or application of the present invention. However, this is not intended to limit the exemplary embodiments in accordance with the concept of the present invention to a particular disclosed form. On the contrary, the present invention is to be understood to include all various alternatives, equivalents, and substitutes that may be included within the spirit and scope of the present invention.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "coupled" to another element, it may be directly coupled or connected to the other element or intervening elements may be present. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for describing various exemplary embodiments only and is not intended to be limiting. As used herein, the singular forms are intended to include the plural forms as well, unless the context clearly indicates otherwise. It will be further understood that the terms "comprise", "include", "have", etc. when used in the present specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Hereinafter, various exemplary embodiments of the present invention will be described in detail with reference to the accompanying drawings. Throughout the drawings, the same reference numerals will refer to the same or like parts.

Figure 2:
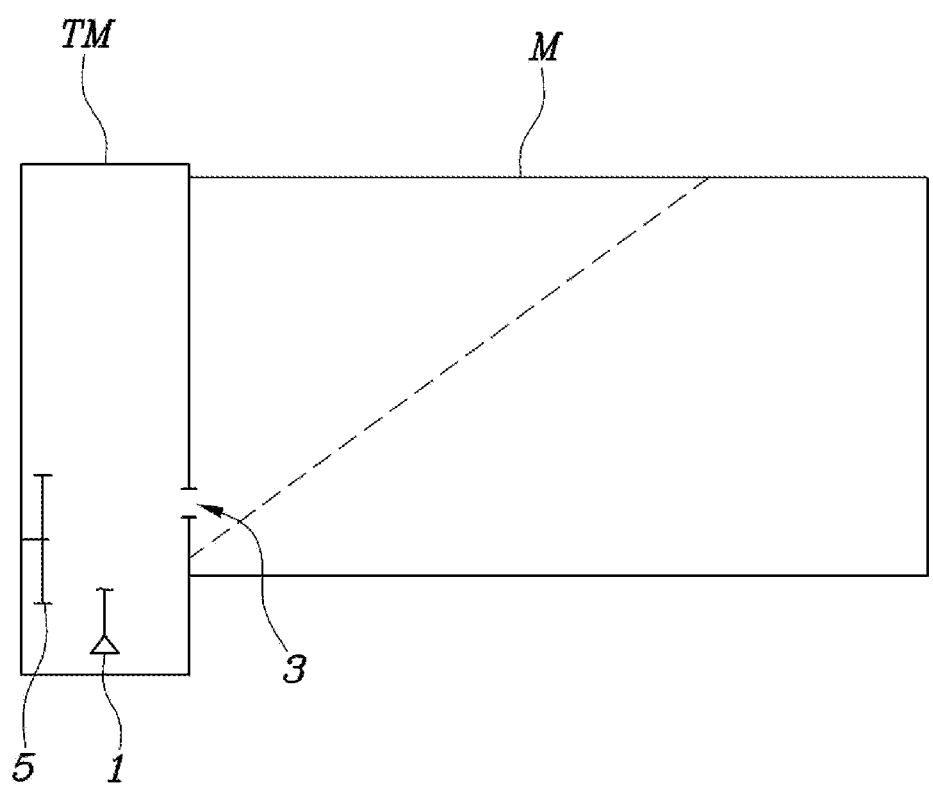
FIG. 2 is a view showing an oil sloshing phenomenon which may occur in the powertrain of FIG. 1.

Referring to FIG. 1 and FIG. 2, a powertrain to which various exemplary embodiments of the present invention may be applied is provided with a transmission portion TM, includes: a motor portion M having a built-in motor that generates power; and a plurality of gears 5 to transmit the power of the motor to driving wheels, and is configured such that an EOP is mounted on the transmission portion TM, and an oil intake port 1 of the EOP is provided at a lower side of an internal space of the transmission portion TM.

In the above powertrain, the EOP pumps the oil into the oil intake port 1 to supply the oil to the motor portion M, the oil which has cooled and lubricated the motor portion M is configured to return to the transmission portion TM through a return hole 3, and the transmission portion TM is provided with the gears 5 for churning the oil on the lower side of the transmission portion TM, so that various parts belonging to the transmission portion TM are lubricated and cooled by the oil churned by the gears 5.

FIG. 2 illustrates a situation in which the oil intake port 1 of the EOP may be exposed outside an oil level due to occurrence of an oil sloshing phenomenon in the powertrain. When the oil sloshing phenomenon occurs to the right side of the dotted line in FIG. 2, there is substantially no oil returned to the transmission portion TM, even though an average level of oil is higher than the level of the return hole 3. Therefore, when the EOP continues to operate in the present situation, the oil intake port 1 is exposed outside the oil level, so that air is introduced into the EOP, durability of the EOP deteriorates, and oil churning by the gears 5 is also not performed, whereby lubrication and cooling of various parts of the transmission portion TM may not be performed.

Obviously, the present invention is not limited to be applicable only to the powertrain having the structure as described above, but may be used to resolve similar situations in other cases.

The EOP is controlled by a controller CLR, and from a navigation 7, the controller CLR may receive curvature data and the like of a road on which a vehicle is running, and is configured to receive signals detected from an acceleration sensor 9, a lateral acceleration sensor 11, a gradient sensor 13, a steering wheel angle sensor 15, a vehicle speed sensor 17, etc.

Figure 3:
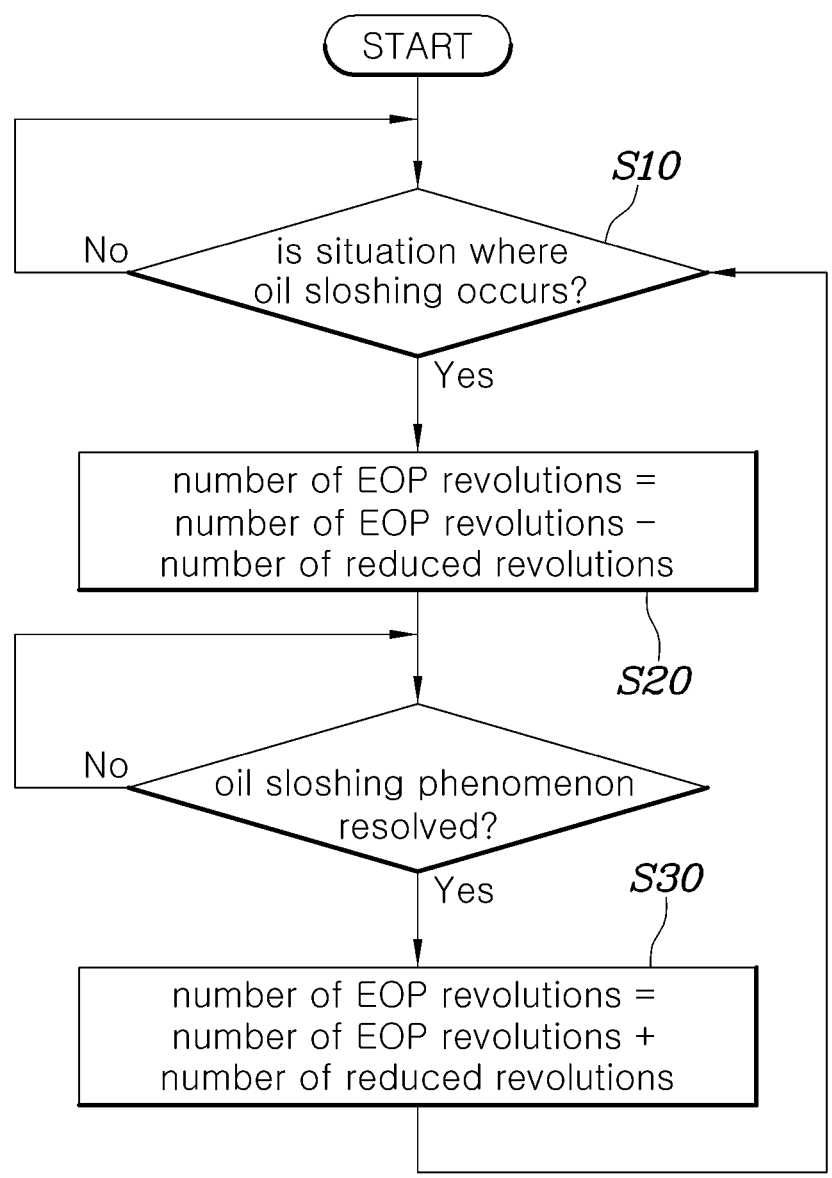
FIG. 3 is a flowchart showing a method of controlling an EOP of the powertrain of the vehicle according to various exemplary embodiments of the present invention.

FIG. 3 is a flowchart showing a method of controlling an EOP of a powertrain of a vehicle according to various exemplary embodiments of the present invention, and the method includes: a step S10 of determining, by a controller CLR while the vehicle is running, whether an oil sloshing phenomenon may occur, the oil sloshing phenomenon being difficult for oil to return to a space where an oil intake port of the EOP is positioned; and a step S20 of reducing, by the controller CLR, the revolutions per minute (RPM) of the EOP by a predetermined reduced RPM when it is determined that the oil sloshing phenomenon may occur.

In other words, in various exemplary embodiments of the present invention, when when the oil sloshing phenomenon may occur, in a state similar to that of FIG. 2, while the vehicle is running, even though the amount of oil returned to the transmission portion TM where the oil intake port 1 is positioned is decreased, the amount of oil stored in the transmission portion TM is allowed to continuously reach an appropriate level by reducing the revolutions per minute (RPM) of the EOP by the number of reduced revolutions, so that air is prevented from entering the EOP, and the gears 5 of the transmission portion TM continuously churns the oil, ensuring that smooth and stable lubrication and cooling of the transmission portion TM may be continued.

Therefore, in accordance with the technical intent as described above and by taking into account that the amount of oil returned is reduced according to the degree of the oil sloshing phenomenon, the number of reduced revolutions may be set so that the oil level of the transmission portion TM may be stably secured even when the amount of returned oil is reduced.

For example, as described later, according to at least one or more of acceleration, a lateral acceleration, gradient, steering wheel angle, vehicle speed, and road curvature, which are criteria for determining the situation where the oil sloshing phenomenon may occur, a map of the number of reduced revolutions is determined and provided by design through a number of experiments and analysis in advance, and the controller CLR refers to the present map so that it is possible to determine and use the number of reduced revolutions suitable for the driving situation of the vehicle.

In the instant case, even though the revolutions per minute (RPM) of the EOP is reduced by the number of reduced revolutions, the portion receiving oil by the operation of the EOP, for example, the motor portion M, has a sufficient amount of oil remaining due to the oil sloshing phenomenon, so that there is no problem in lubrication and cooling.

Furthermore, since the above-described oil sloshing phenomenon occurs only very temporarily while the vehicle is running, the reduction in the revolutions per minute (RPM) of the EOP as described above does not result in a decrease in the overall lubrication and cooling functions of the powertrain.

When the longitudinal acceleration of the vehicle is greater than or equal to a predetermined reference acceleration, the controller CLR may determine that the oil sloshing phenomenon may occur.

That is, when a vehicle accelerates or decelerates rapidly, the above oil sloshing phenomenon may occur, so that when the longitudinal acceleration of the vehicle measured by the acceleration sensor 9 mounted on the vehicle is greater than or equal to the reference acceleration, as described above, the revolutions per minute (RPM) of the EOP is reduced by the predetermined reduced RPM according to the acceleration, preventing the oil in the space where the oil intake port 1 of the EOP is positioned from rapidly decreasing.

Accordingly, in the vehicle to which various exemplary embodiments of the present invention is to be applied, according to the oil sloshing phenomenon in the powertrain due to the sudden acceleration or rapid deceleration of the vehicle, the reference acceleration may be set to an appropriate level by a number of experiments measuring a state in which oil is returned to the space where the oil intake port 1 of the EOP is positioned.

Meanwhile, when the gradient sensor 13 mounted on the vehicle detects that the gradient of a road on which the vehicle is running is greater than or equal to a predetermined reference gradient, the controller CLR may determine that the oil sloshing phenomenon may occur.

That is, since the oil sloshing phenomenon in the powertrain as described above may occur even in the case where the vehicle climbs a steep slope or vice versa, when a gradient of the road is detected by the gradient sensor 13 provided in the vehicle and the gradient is greater than or equal to the reference gradient, the revolutions per minute (RPM) of the EOP is reduced by the predetermined reduced RPM according to the gradient as described above, preventing the oil in the space where the oil intake port 1 of the EOP is positioned from rapidly decreasing.

Therefore, in the vehicle to which various exemplary embodiments of the present invention is to be applied, the reference gradient may be set to an appropriate level through a number of experiments measuring the state of oil returned to the space where the oil intake port 1 of the EOP is positioned, according to the oil sloshing phenomenon in the powertrain due to the driving of the vehicle on an uphill road or downhill road.

Furthermore, when the vehicle's lateral acceleration determined from the vehicle's steering wheel angle and vehicle speed is greater than or equal to a predetermined reference lateral acceleration, the controller CLR may determine that the oil sloshing phenomenon may occur.

That is, since the above oil sloshing phenomenon may occur when the vehicle is running in a sudden turn, the lateral acceleration of the vehicle is determined from the steering angle of a steering wheel and the vehicle speed, so that as described above, when the present lateral acceleration is greater than or equal to the above reference lateral acceleration, the revolutions per minute (RPM) of the EOP is reduced by the predetermined reduced RPM according to the lateral acceleration, preventing the oil in the space where the oil intake port 1 of the EOP is positioned from rapidly decreasing.

Accordingly, in the vehicle to which various exemplary embodiments of the present invention is to be applied, the reference lateral acceleration may be set to an appropriate level by a number of experiments measuring the state in which the oil is returned to the space where the oil intake port 1 of the EOP is positioned, according to the oil sloshing phenomenon in the powertrain due to a sudden turn of the vehicle.

Furthermore, when the lateral acceleration of the vehicle determined from the road curvature data provided from the navigation 7 of the vehicle and the current speed of the vehicle are greater than or equal to the reference lateral acceleration, the controller CLR may determine that the oil sloshing phenomenon may occur.

That is, when road curvature data on a vehicle's driving path provided by the navigation 7 indicates that the vehicle may turn and drive, the lateral acceleration of the vehicle may be determined according to the road curvature and the vehicle speed at that time, so that the lateral acceleration determined as described above is compared with the reference lateral acceleration, allowing the revolutions per minute (RPM) of the EOP to be controlled as described above.

Furthermore, when the lateral acceleration of the vehicle directly detected by the lateral acceleration sensor 11 mounted on the vehicle is greater than or equal to the reference lateral acceleration, the controller CLR may determine that the oil sloshing phenomenon may occur.

In other words, the lateral acceleration of the vehicle may not be determined as described above, but may be directly obtained by the lateral acceleration sensor 11 mounted on the vehicle and then used accordingly.

For reference, when determining whether physical quantities such as acceleration, a lateral acceleration, and gradient are greater than or equal to the predetermined reference values in the above, these acceleration, a lateral acceleration, and gradient are to be determined as absolute values.

Meanwhile, when the oil sloshing phenomenon is resolved, the controller CLR performs a step S30 of increasing the revolutions per minute (RPM) of the EOP by the number of reduced revolutions, to return the revolutions per minute (RPM) of the EOP to its original number of revolutions.

Whether or not the oil sloshing phenomenon has been resolved may be determined by observing whether each physical quantity is recovered to a value less than each reference value, the physical quantity being such as acceleration, a lateral acceleration, gradient, steering wheel angle, vehicle speed, and road curvature, each of which is the criteria for determining the situation in which the oil sloshing phenomenon may occur.

As described above, the present invention ensures that even without carrying additional oil to prevent the oil sloshing phenomenon in the powertrain from occurring depending on the driving situation of the vehicle, when the oil sloshing phenomenon may occur, the number of EOP rotations is appropriately reduced so that sufficient oil may always be supplied to the oil intake port 1 of the EOP, whereby proper oil supply is always available to all parts of the powertrain that need oil, and thus the durability of the entire powertrain including the EOP may be prevented from deteriorating, and it is possible to obtain an effect of reducing cost and weight, avoiding unnecessary dragging, and reducing the possibility of oil leakage, due to the exclusion of the additional oil.

Furthermore, the term related to a control device such as "controller", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling an electric oil pump (EOP) of a powertrain apparatus, the method comprising:
   determining, by a controller electrically connected to the EOP, whether an oil sloshing phenomenon occurs in the powertrain apparatus while a vehicle is running; and
   reducing, by the controller, revolutions per minute (RPM) of the EOP by a predetermined reduced RPM when the controller determines that the oil sloshing phenomenon occurs.

2. The method of claim 1, wherein when a longitudinal acceleration of the vehicle is greater than or equal to a predetermined reference acceleration, the controller is configured to conclude that the oil sloshing phenomenon occurs.

3. The method of claim 1, wherein when a gradient sensor mounted on the vehicle detects that a gradient of a road on which the vehicle is running is greater than or equal to a predetermined reference gradient, the controller is configured to conclude that the oil sloshing phenomenon occurs.

4. The method of claim 1, wherein when a lateral acceleration determined from a steering wheel angle and a speed of the vehicle is greater than or equal to a predetermined reference lateral acceleration, the controller is configured to conclude that the oil sloshing phenomenon occurs.

5. The method of claim 1, wherein when a lateral acceleration of the vehicle determined from road curvature data received from a navigation of the vehicle and a current speed of the vehicle is greater than or equal to a reference lateral acceleration, the controller is configured to conclude that the oil sloshing phenomenon occurs.

6. The method of claim 1, wherein when a lateral acceleration of the vehicle detected by a lateral acceleration sensor mounted on the vehicle is greater than or equal to a reference lateral acceleration, the controller is configured to conclude that the oil sloshing phenomenon occurs.

7. The method of claim 1, further including:
   increasing, by the controller, the RPM of the EOP by a predetermined RPM when the oil sloshing phenomenon is resolved.

8. The method of claim 7, wherein the predetermined RPM is equal to the predetermined reduced RPM.

9. A non-transitory computer readable storage medium on which a program for performing the method of claim 1 is recorded.

10. A powertrain apparatus comprising:
    a transmission portion;
    a motor portion fluidically connected to the transmission portion through a return hole;
    an electric oil pump (EOP) mounted on the transmission portion, wherein an oil intake port of the EOP is provided at a lower side of an internal space of the transmission portion, wherein the EOP pumps oil into the oil intake port to supply the oil to the motor portion and the oil which has cooled and lubricated the motor portion returns to the transmission portion through the return hole; and
    a controller electrically connected to the EOP, and configured for:
    determining, while a vehicle is running, whether an oil sloshing phenomenon occurs in the powertrain apparatus; and
    reducing, revolutions per minute (RPM) of the EOP by a predetermined reduced RPM when the controller determines that the oil sloshing phenomenon occurs.

11. The powertrain apparatus of claim 10, wherein when a longitudinal acceleration of the vehicle is greater than or equal to a predetermined reference acceleration, the controller is configured to conclude that the oil sloshing phenomenon occurs.

12. The powertrain apparatus of claim 10, wherein when a gradient sensor mounted on the vehicle detects that a gradient of a road on which the vehicle is running is greater than or equal to a predetermined reference gradient, the controller is configured to conclude that the oil sloshing phenomenon occurs.

13. The powertrain apparatus of claim 10, wherein when a lateral acceleration determined from a steering wheel angle and a speed of the vehicle is greater than or equal to a predetermined reference lateral acceleration, the controller is configured to conclude that the oil sloshing phenomenon occurs.

14. The powertrain apparatus of claim 10, wherein when a lateral acceleration of the vehicle determined from road curvature data received from a navigation of the vehicle and a current speed of the vehicle is greater than or equal to a reference lateral acceleration, the controller is configured to conclude that the oil sloshing phenomenon occurs.

15. The powertrain apparatus of claim 10, wherein when a lateral acceleration of the vehicle detected by a lateral acceleration sensor mounted on the vehicle is greater than or equal to a reference lateral acceleration, the controller is configured to conclude that the oil sloshing phenomenon occurs.

16. The powertrain apparatus of claim 10, wherein the controller is further configured for:
    Increasing the RPM of the EOP by a predetermined RPM when the oil sloshing phenomenon is resolved.

17. The powertrain apparatus of claim 16, wherein the predetermined RPM is equal to the predetermined reduced RPM.

* * * * *